(12) United States Patent
Park et al.

(10) Patent No.: US 6,645,558 B2
(45) Date of Patent: Nov. 11, 2003

(54) METHOD FOR FORMING MOLECULAR LAYERS HAVING HIGH DENSITY OF PRIMARY AMINE GROUP ON SOLID SUPPORTS

(75) Inventors: Joon-Won Park, Pohang (KR); Hong-Jin Kim, Jinhae (KR)

(73) Assignee: Pohang University of Science and Technology Foundation, Pohang (KR)

( * ) Notice: Subject to any disclaimer, the term of this patent is extended or adjusted under 35 U.S.C. 154(b) by 0 days.

(21) Appl. No.: 10/239,389

(22) PCT Filed: Jan. 31, 2001

(86) PCT No.: PCT/KR01/00128
§ 371 (c)(1),
(2), (4) Date: Nov. 18, 2002

(87) PCT Pub. No.: WO01/70851
PCT Pub. Date: Sep. 27, 2001

(65) Prior Publication Data
US 2003/0134041 A1 Jul. 17, 2003

(30) Foreign Application Priority Data
Mar. 24, 2000 (KR) .......................................... 2000-15030
Aug. 11, 2000 (KR) .......................................... 2000-46606

(51) Int. Cl.[7] ............................................. B05D 1/36
(52) U.S. Cl. ...................... 427/340; 427/387; 427/407.2
(58) Field of Search ............................... 427/340, 387, 427/407.2; 428/448

(56) References Cited
FOREIGN PATENT DOCUMENTS
JP 09-301826 * 11/1997

OTHER PUBLICATIONS

Kim et al, Journal of Colloid and Interface Science, 227(1), pp 247–249, 2000.*

Oh et al, Langmuir, 18(5), pp 1764–1769, 2002.*

Jordan et al, Chem. Commun., pp 1025–1026, 1996.*

Tsubokawa et al, Reactive and Functional Polymers, 37, pp 75–82, 1998.*

Fujiki et al, Pure Appl. Chem., A37(4), pp 357–377, 2000.*

Joong Ho Moon et al., "Absolute Surface Density of the Amine Group of the Aminosilylated Thin Layers: Ultra–Visible Spectroscopy, Second Harmonic Generation, and Synchroton–Radiation Photoelectron Spectroscopy Study," *Langmuir* 1997, 13, pp. 4305–4310.

Rainer Jordan et al., "Surface–Initiated Anionic Polymerization of Styrene by Means of Self–Assembled Monolayers," *J. Am. Chem. Soc.* 1999, 121, pp. 1016–1022.

Rainer Jordan et al., "Surface–Initiated Living Cationic Polymerization of 2–Oxazolines," *J. Am. Chem. Soc.*, 1998, 120(2), pp. 243–245.

* cited by examiner

*Primary Examiner*—Erma Cameron
(74) *Attorney, Agent, or Firm*—Leydig, Voit & Mayer, Ltd.

(57) ABSTRACT

Provided is a method for forming solid substrates having high density of primary amine group on its surface, in which the primary amine groups on the surface of an aminosilylated substrate are treated with aziridine or an aziridine derivative. The surface density of the primary amine functional groups (—$NH_2$) on the very top surface of a substrate can be drastically increased.

19 Claims, 4 Drawing Sheets

(A)

Aminosilylated Surface (B)

Polymerised Surface

METHOD FOR FORMING MOLECULAR LAYERS HAVING HIGH DENSITY OF PRIMARY AMINE GROUP ON SOLID SUPPORTS

BACKGROUND OF THE INVENTION

1. Field of the Invention

The present invention is directed to a method for forming molecular layers having high density of primary amine groups on solid supports.

More particularly, this invention relates to a method for forming either linear or hyper-branched polymer layers having high density of primary amine groups on hydroxylated solid supports. Also, this invention relates to a method for growing polymer layers having high density of primary amine group on the solid substrates while utilizing the primary amine on the surface of an aminosilylated substrate to initiate the ring-opening polymerization of aziridine or aziridine derivatives.

2. Description of the Related Art

Silylation, particularly aminosilylation of the surface on solid supports has been applied in a variety of fields including immobilization of biomolecules such as enzyme and antibody, immobilization of inorganic catalysts, modification of electrodes, chromatography, and formation of a self-assembled building foundation using various kinds of molecules such as ionic polymer, nonlinear optical chromophore, fullerene, porphyrin, transition metal complex and inorganic colloidal particle.

The physico-chemical characteristics of the aminosilane layer formed on the surface of solid supports are very important because those determine the structures and the final functionality of the thin film while influencing the shape and the surface density of the immobilized or self assembled molecule.

On the other hand, polymerization initiated on the surface of a substrate has attracted such big attention due to its wide applicability. This invention suggests the fact that new molecular structure accompanying the polymerization can modify the surface properties of a support, and can be chosen to meet various needs. Moreover, chemical bonding between the surface-bound initiator on a support and polymer chain guarantees the excellent stability.

In addition, a "grafting from" methodology will provide desirable morphologies on the surface of a support. Therefore, it seems natural that people are interested in polymerization initiated on solid supports.

Ulman et al. showed that 2-ethyl-2-oxazoline can be cationically polymerized on a gold surface modified with -hydroxyl thiol (J. Am. Chem. Soc. 120, 243(1998)), and they revealed that surface-initiated anionic polymerization of styrene is advantageous over "grafting onto" technique (J. Am. Chem. Soc. 121, 1016(1999)). Recently, Grubbs et al. successfully demonstrated that ring-opening metathesis polymerization (ROMP) catalyst polymerizes norbornene at a solid support to make a polymer brush successfully (J. Am. Chem. Soc. 121, 4088(1999)).

It has been generally known that the surface density of the primary amine functional group (—NH2) is about 3.5 amines/100 Å$^2$ on the very top surface when a relevant reagent was applied on the surface of a solid support. However, the conventional solid supports having such a low density of primary amine group suffer from limited applicability and therefore need to be improved. A solid support having primary amine groups on its surface is suitable as a substrate for DNA chip or various kinds of biochip. However, the density of 3.5 amines per 100 Å$^2$ on the surface of a support is not high enough to hold hydrogels containing DNA oligonucleotides or other biomolecules of different effects because those microbeads need stronger adhesion for the higher reusability. Therefore, the conventional solid supports have not served for the high stability of the biochips and the wide applicability.

SUMMARY OF THE INVENTION

The present invention is directed to providing a method for forming molecular layers with high density of primary amine groups on substrates.

The present invention is related to a method for forming molecular layers with high density of primary amine group on solid supports by allowing the primary amine groups on the surface of an aminosilylated substrate to react with aziridine or aziridine derivatives.

This invention is also related to aminosilylated substrates having high density of primary amine groups, generated according to the method of the invention.

The invention is characterized by treating primary amine groups of aminosilylated substrates with aziridine or its derivatives thereby tailoring the chemical and physical properties of the thin films on the substrate. It is preferable to use aziridine of formula 1

[Formula 1]

or a protected aziridine derivative of formula 2

[Formula 2]

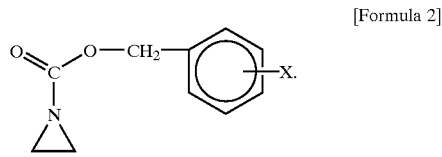

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings, wherein.

DETAILED DESCRIPTION OF THE PREFERRED EMBODIMENTS

This invention is characterized by treating primary amine groups of aminosilylated substrates with aziridine or its derivatives thereby tailoring the chemical and physical properties of the thin films formed on the substrate. In one embodiment, it is preferable to use aziridine of formula 1

[Formula 1]

In another embodiment, it is preferable to use a protected aziridine derivative. Any aziridine compound in which the nitrogen functional group is protected can be used as the protected aziridine derivative. A preferred protected aziridine compound is an aziridine derivative of formula 2.

[Formula 2]

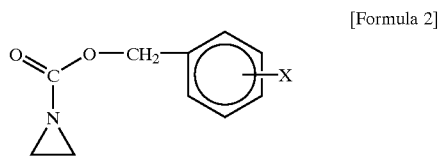

The compounds of formula 2, wherein X is selected from the group consisting of hydrogen, nitro, alkoxy, and mixtures thereof are preferable owing to the easy removal (i.e., deprotection) of the protecting group after the polymerization reaction.

The primary amine groups in aminosilylated molecular layers and aziridine or aziridine derivatives are reacted by immersing (i.e., contacting) the aminosilylated substrate in a solvent solution (e.g., dichloromethane) containing the dissolved aziridine or aziridine derivatives and a catalytic amount of an acid (e.g., acetic acid). The solution is preferably heated under an inert atmosphere to increase the reaction rate (e.g., to reflux for 24 hours under nitrogen).

Figure 1:
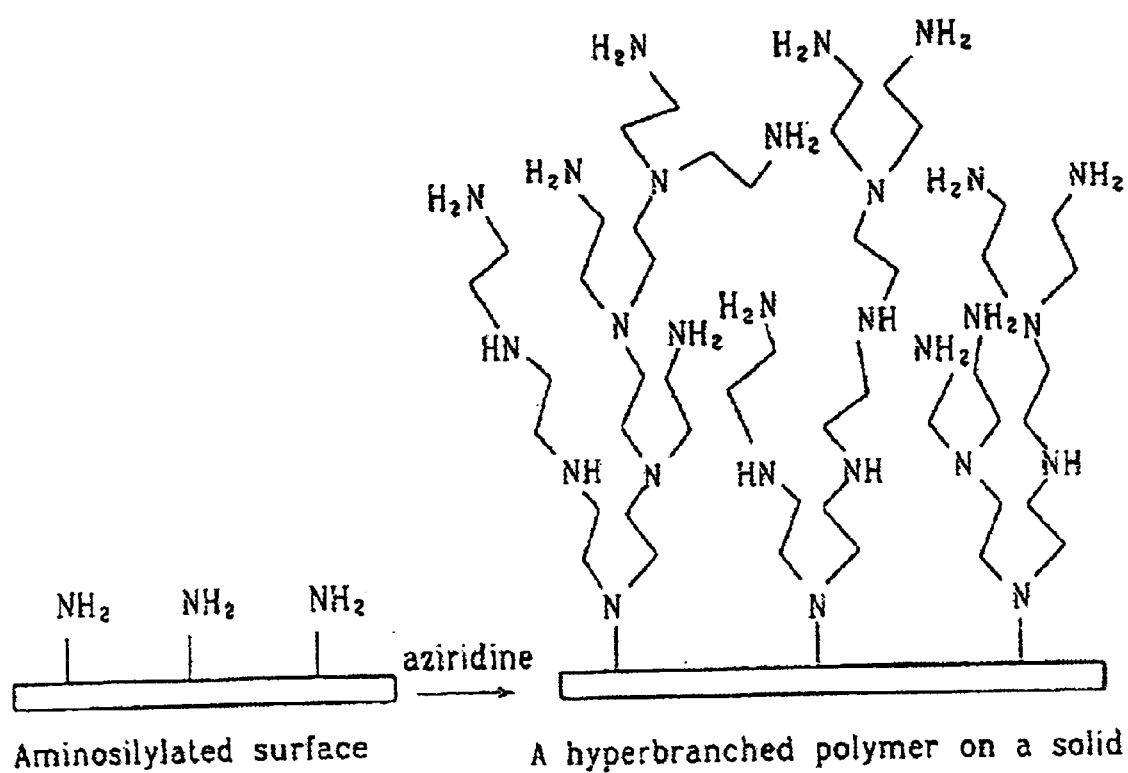
FIG. 1 shows the reaction process between aziridine and primary amine groups on the surface of an aminosilylated substrate where a ring-opening polymerization occurs to form poly(ethyleneimine) chains (linear or branched) on the surface.

Due to the reactivity between aziridine and primary amines, a ring-opening polymerization occurs which generates poly(ethyleneimine) in the form of either a linear chain or a branched chain on the surface of the aminosilylated substrate (see FIG. 1). When using the protected aziridines, the ring-opening reaction produces a linear chain without forming branches on the surface of an aminosilylated substrate, in which a deprotection step should follow the ring-opening step for the further growth.

In this invention, a method for forming molecular layers with high density of primary amine groups on the surface of aminosilylated substrates will be explained in more detail with the reference to figures.

First, a solid support with clean and dry surface is immersed in (contacted with) a mixture including an aminosilane compound and a suitable solvent for an appropriate reaction time to form the reactive primary amine functional groups on the surface of the support. The support is preferably a hydroxylated support, such as a silicon wafer, fused silica, and other like materials known in the field. The aminosilane compound to be used preferably does not form acidic by-products. Preferred aminosilane compound are (3-aminopropyl)diethoxymethylsilane, (3-aminopropyl) ethoxydimethylsilane, (3-aminopropyl)triethoxysilane, and mixtures thereof. A suitable solvent is any solvent that can be used to dissolve the aminosilane compound, which include organic solvents such as toluene and benzene. The resulting aminosilylated substrate is thoroughly washed with the solvent and dried in vacuum at room temperature.

The aminosilylated substrate is immersed in (contacted with) the solution comprising the aziridine or aziridine derivative, the acid catalyst, and the solvent. As described above, the solution is preferably heated to reflux under the inert gas atmosphere. An appropriate heating temperature of the reaction between the aminosilylated surface and the aziridine compound is preferably between 40° C. and 100° C. The aziridine or aziridine derivatives will be vaporized over 100° C. and thus decreasing the efficiency of the reaction. The reactivity of the components will also decrease under 40° C. Acid catalysts to be used in the present invention include acetic acid, p-toluenesulfonic acid, and the like. Solvents to be used in the present invention are organic solvents such as dichloromethane, toluene, acetonitrile, and the like. Subsequently, the resulting substrate is thoroughly washed with the proper organic solvent.

When a protected aziridine is employed, a deprotection step to eliminate the protecting group from the surface of the substrates should follow the reaction of the aminosilylated substrate with the protected aziridine. For example, when benzyl 1-aziridinecarboxylate (or N-Cbz aziridine) is used as the protected aziridine, the substrate is immersed in neat triflouroacetic acid and sonicated at room temperature for the deprotection. Subsequently, the surface of the substrate is washed with a copious amount of a solvent such as methanol to remove triflouroacetic acid remaining from the previous step. A particular acid such as trifluoroacetic acid, aqueous trifluoroacetic acid, and boron tribromide ($BBr_3$) can be used for the deprotection, and the best result can be obtained with neat trifluoroacetic acid (No other generic acids work for it).

Figure 2:
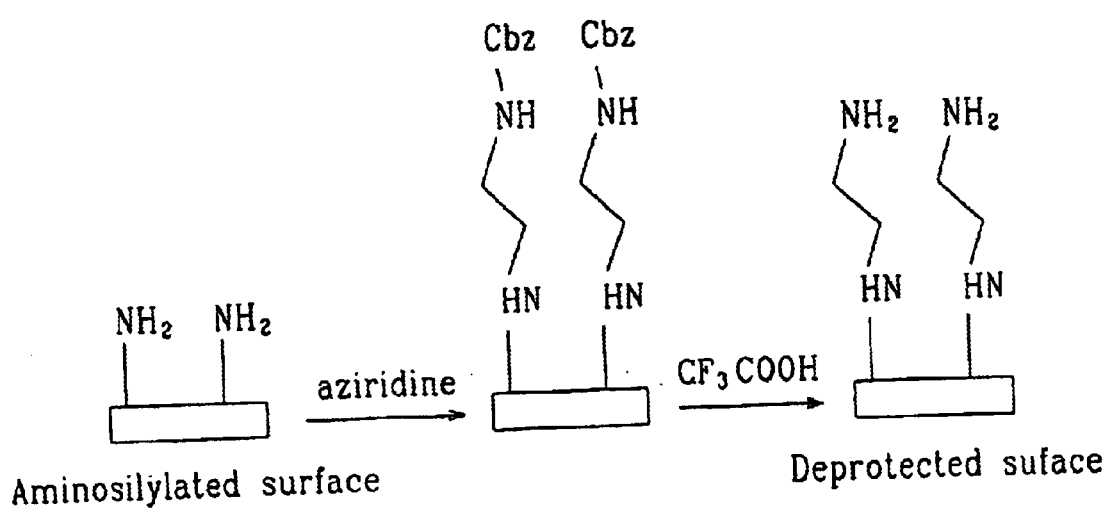
FIG. 2 shows a stepwise growth of poly (ethyleneimine) by reacting a protected aziridine, benzyl 1-aziridinecarboxylate (N—Cbz aziridine), with the primary amine groups on the surface of an aminosilylated substrate.

In this invention, the substrates having molecular layers of the structures shown in FIG. 1 and FIG. 2 are obtained. Referring to FIG. 1, ring-opening polymerization occurs to form a hyperbranched polymer on the aminosilylated substrate by using aziridine. The polymerization can result in either a linear chain or a branched chain depending on whether the primary amine is converted to a secondary or tertiary amine when reacting with aziridine. In the latter case, the branching occurs when the nitrogen atom of the aminosilane compound or of the reacted aziridine reacts with more than one aziridine forming a hyperbranched poly (ethyleneimine) on the surface.

A reliable way to judge whether the branching occurs is to ascertain the surface density of the end group (i.e., the primary amine). Absorbance at 284 nm owing to 4-nitrobenzaldimine occurs when the primary amine is converted to an imine using 4-nitrobenzaldehyde as described in Moon et al., *Langmuir* 13,4305 (1997), which in incorporated herein by reference. Thus, a sharp increase in absorbance is expected due to the increased number of primary amines after the polymerization. The absolute density of the primary amine groups is also determined by hydrolyzing the imine groups with a known amount of water as described in Moon et al.

Before treating with aziridine or the aziridine derivative, the surface of aminosilylated substrate has the comparatively flat structure with a constant height and density. However, the growth accompanying branching usually forms a rough surface due to the formation of irregular polymer chain lengths, which is believed to be caused by aziridine reacting randomly with other aziridine molecules. Branching thus provides a higher surface density of primary amines than obtained with a population of similar chain lengths.

In order to prepare a better-defined (i.e., smoother) polymer layer on the surface of the substrate, a stepwise polymerization is used. Referring to FIG. 2, the primary amines on the surface of an aminosilylated substrate are reacted with N-Cbz aziridine, providing only modified amines on the very top surface of the substrate and similar polymers chain lengths as a result. This avoids the formation of irregular polymer chain lengths that leads to a rougher polymer surface (i.e., a more uneven surface morphology).

In another embodiment of this invention, a solid support having a high density of primary amines is provided. An absolute surface density of the primary amines of at least greater than 3.5 amines/nm$^2$ is preferable. A surface density of at least 10 amines/nm$^2$, with at least 48 amines/nm$^2$, or greater are also obtainable.

Solid supports with a high surface density of primary amine groups in this invention are highly useful in the development of DNA chips (arrays) or various others kinds of biochips. Descriptively, in the case of DNA chip, hydrogels or polymers containing an oligonucleotide as well as —N=C=O groups available for the chemical bonding with a primary amine can be more stably attached to the surface of the polymerized aminosilylated solid supports of the invention because of the high density of primary amines providing more points for attachment. Also, in the case of biochips utilizing an enzyme or other biomolecules, the host macromolecules can be more stably attached to the polymerized layer on the top of the solid support. Therefore, this invention improves the stability of biochips and thereto improving the manufacture and handling processes.

The present invention will now be explained in more detail with reference to the following Examples. As will be realized, the invention is capable of being modified in various obvious respects, all without departing from the invention. Accordingly, the drawings and description are to be regarded as illustrative in nature, and not restrictive. However, these are to illustrate the present invention and the present invention is not limited thereto.

EXAMPLES

Example 1

Aminosilylation and Polymerization of a Solid Support

A silica or glass substrate thoroughly washed and dried in vacuum of approximately 20 mTorr was immersed and incubated in the toluene solution containing 10$^{-3}$ M of (3-aminopropyl)diethoxymethylsilane under nitrogen at room temperature. Typically, the substrate is rectangular (10×30×1.5 mm for fused silica; 10×30×0.5 mm for silicon wafer; 25×75×1.0 mm for glass slide) in shape. The fused silica is UV-transparent materials made of molten SiO$_2$, whereas silicon wafer is made of pure silicon (Si). Because the surface of the latter has a naturally formed oxide layer in the air, the surface is practically the same as that of the fused silica. However, it is not transparent to UV-vis light, the underlying bulk materials, Si, absorb the light. A glass slide made of soda lime glass can be applied for the modification, and glass slides made of other materials such as borosilicate glass can also be employed. Because of the simplicity in terms of the composition and the regularity of the surface, more satisfactory results will be obtained with the fused silica and the silicon wafer.

After the aminosilylation reaction, the substrate was washed using toluene and baked at 120° C. for 30 minutes. The substrate was cooled down to room temperature, and washed by sonication for 3 minutes sequentially in toluene, mixture of toluene and methanol (volume ratio of 1:1), and then methanol.

The aminosilylated silica substrate was immersed in dichloromethane solution (20 ml) including 0.2 ml of aziridine and a drop (about 20 microliter) of acetic acid. The solution was heated to reflux at 80° C. for 24 hours under nitrogen.

The resulting substrate was thoroughly washed with a copious amount of dichloromethane and sonicated in methanol three times. Finally, the washed substrate was dried in vacuum at room temperature.

Example 2

Reaction with Protected Aziridine and Elimination of the Protecting Group

The same procedure as in Example 1 was used except that toluene was employed as the solvent for the reaction. In addition, a protected aziridine derivative, benzyl 1-aziridinecarboxylate (N-Cbz aziridine), was used instead of aziridine for treating the primary amines on the surface of the substrate.

The N-Cbz group was eliminated from the modified surface with the following procedure. The silica substrate was immersed in neat trifluoroacetic acid and sonicated for 20 min at room temperature. Subsequently, the substrate was washed with a large amount of methanol and sonicated in methanol for 10 min three times.

Example 3

Aminosilylation of the Surface of a Silica Substrate Using (3-Aminopropyl) dimethylethoxysilane For a Lower Initial Density of the Primary Amine Groups of a Substrate The primary amines on the surface of a silica substrate and N-Cbz aziridine were reacted using the same method as in Example 1, except that (3-aminopropyl) dimethylethoxysilane was used instead of (3-aminopropyl) diethoxymethylsilane for the aminosilylation step to form a lower initial density of primary amine groups on the surface of a substrate.

Example 4

Confirmation of the Primary Amine Density and the Thickness of the Aminosilylated Layer Before and After Polymerization With Aziridine The surface primary-amine density and thickness of the aminosilylated layer built on the silica substrate in Example 1 were measured before treating the solid support with aziridine. The thickness of the aminosilylated surface was measured with an optical ellipsometer, and the surface density of the amine was measured with a method developed by Moon et al. The thickness of the aminosilylated layer was 8 Å and the surface density of the functional groups was 3.5 amines/nm$^2$.

After the reaction with aziridine, the thickness of the film on the silica substrate was measured again. The thickness of the film increased incrementally with the reaction time and reached 36 Å in 24 hours. Therefore, it seems that the growth meets a saturation point where the propagation rate decreases. At the saturation point, the measured density of the primary amine groups was 66 amines/nm$^2$. Beyond this point, the absolute density of the primary amine groups was constant.

Example 5

Confirmation of the Primary Amine Density and the Thickness of a Film of the Hyperbranched Polymer on the Surface of a Solid Support In accordance with the invention, the reaction between aziridine and the aminosilylated substrate goes through a ring-opening polymerization to form hyperbranched polymer, i.e., poly(ethyleneimine) on the support surface (FIG. 1). The polymerization can result in either a linear chain or a branched one, depending on whether the primary amine groups are converted to secondary or tertiary amines upon reacting with aziridine.

Figure 3:
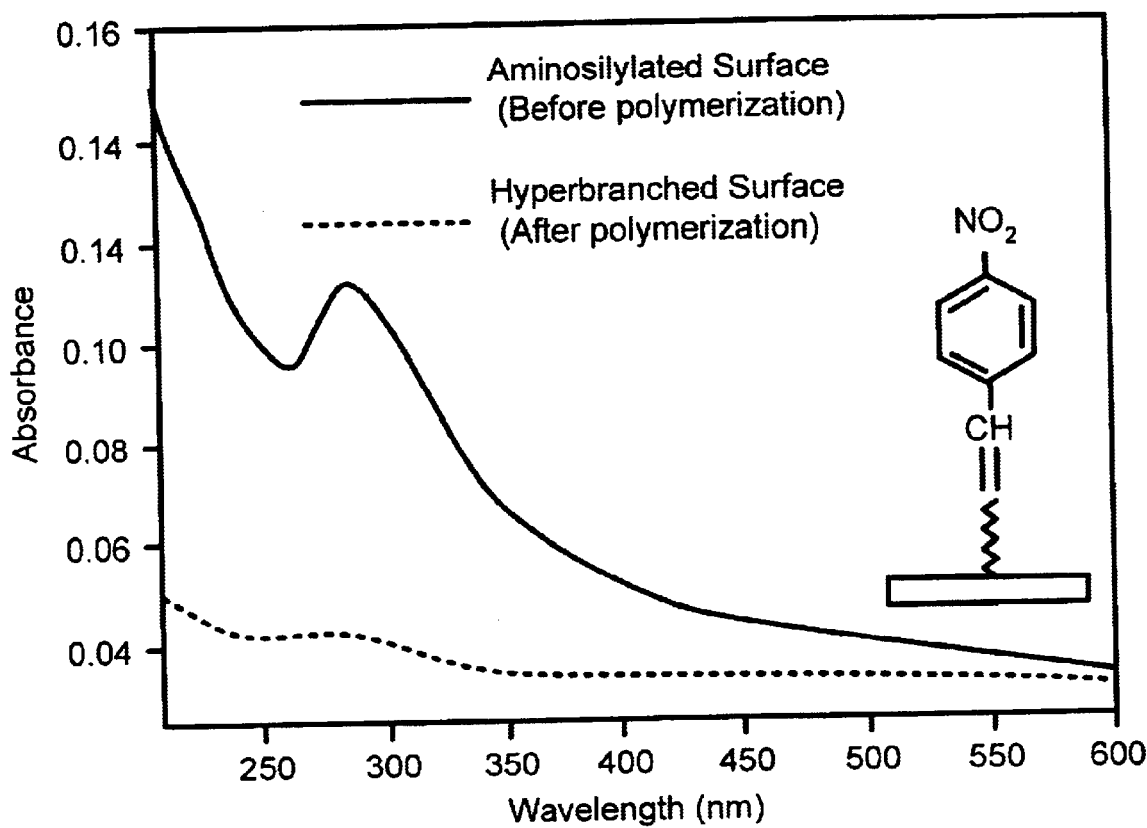
FIG. 3 is a graph showing UV-vis spectra of a 4-nitrobenzaldimine-derivatized surface of an aminosilylated substrate before and after the polymerization according to Example 1.

A reliable way to judge whether the branching occurs is to approximate the surface density of the end group, i.e., the primary amine. The absorbance at 284 nm owing to 4-nitrobenzaldimine occurs when the primary amine is converted to the imine. By comparing absorbance before and after ring-opening polymerization, a relative approximation of surface density was determined for the silica substrate of Example 1 following the procedure in Moon et al., Langmuir 13,4305 (1997). As shown in FIG. 3, in case of Example 1, due to the increased number of primary amines after the polymerization, the absorbance at 284 nm was sharply higher.

The absolute density of the amine groups was also determined by hydrolyzing the imine in a known amount of water following the procedure of Moon et al. It was found that the absolute density of the primary amines increased dramatically from 3.5 amines/nm$^2$ to 66 amines/nm$^2$ in 24 h as shown in Table 1. The observation definitely shows that branching was operative; otherwise a constant surface density would be obtained regardless of the chain growth. It is noteworthy that the density did not increase after 24 hours. Taking the slow but persistent increase of the thickness after 24 hours into consideration, branching remains constant beyond a particular stage.

TABLE 1

| Stage | Contact angle(°) | Thickness (Å) | Absolute density (number of primary amines/nm$^2$) |
|---|---|---|---|
| After aminosilylation | 62(+2) | 8 | 3.5 |
| After polymerization | 62(+2) | 36 | 66 |

In fact, the growth accompanying the branching in solution appeared to stop after 3 or 4 cycles, which was attributed to steric hindrance. Therefore, the increase of the surface density should be less than 16-times (2$^4$) upon the branching because of the spatial restriction. The observed higher increase of the density (ca. 19-times) indicated that the length of the polymer chains varied. Polymer chains that are irregular in terms of length give a rougher surface (i.e., a more uneven surface morphology) and provide a higher surface density of primary amine groups than that of a population of similar length polymer chains.

Example 6

Confirmation of the Surface Density of a Primary Amine and the Thickness of a Polymer Film Constructed on the Surface Having Lower Density of the Primary Amine The same ring-opening polymerization reactions as in Example 1 and Example 2 were applied on silica substrates previously aminosilylated with (3-aminopropyl) dimethylethoxysilane to obtain an absolute primary amine surface density of 1.5 amines/nm$^2$. The density of 1.5 amines/nm$^2$ is regarded as the low surface density relative to that of the substrate from (3-aminopropyl) diethoxymethylsilane. The thickness of the film, as measured using the procedure of Moon et al., increased from 4 to 18 Å upon reaction in 24 hours. Also, the absolute surface density of the primary amine group increased to 48 amines/nm$^2$. It seems that the surface density approaches the one observed in either example 1 or example 2 despite its low initial density. This phenomenon indicates that the final surface density is mainly controlled by the molecular volume that is governed by the Van der Waals radii.

Example 7

Confirmation of the Stepwise Growth of the Polymer Using Protected Aziridine The aminosilylated substrate of Example 2 before and after polymerization with the N-Cbz aziridine was analyzed following the procedure of Moon et al. The aminosilylated layer (8 Å, 3.5 amines/nm$^2$) formed with (3-aminopropyl) diethoxymethylsilane was allowed to react with N-Cbz aziridine in refluxing toluene. In order to complete the reaction, a solvent with a higher boiling point, toluene was chosen.

After the reaction, the surface density of the primary amine groups for the polymerized substrate of Example 2 was measured by derivatizing the intact primary amine groups with 4-nitrobenzaldehyde, hydrolyzing thus-formed imine by dipping the derivatized substrate in a known volume of water, and subsequently measuring the absorbance at 284 nm.

As anticipated, the primary amine groups were not detected due to the lack of absorbance at 284 nm. In other words, all the primary amines were bound to N-Cbz aziridine providing only the modified amines on the very top surface of the film (FIG. 2). The polymerized aminosilylated substrate of Example 2 exhibited an increased contact angle of 70° which reflects the hydrophobic nature of the modified surface. Also, the thickness of the film increased to 16 Å from 8 Å which matches the calculated value. Upon the deprotection in trifluoroacetic acid, the water contact angle returned to the value of a pristine aminosilylated layer (60°), and the thickness reduced to 12 Å. The physical properties of the surface indicate that the deprotection is as successful as in the liquid phase. It is worthwhile to note that the absolute density of the primary amine groups (3.5 amines/nm$^2$) did not increase at all. The increased reaction time did not enhance the density of the resulting surface. Upon the subsequent reaction with N-Cbz aziridine, it was observed that the thickness of the layer increased again. After the first full cycle, the thickness increased to 12 Å and after the second full cycle, it increased to 18 Å. Therefore, the thickness increased by 6 Å after each full cycle. It is believed that the steric congestion of the protecting group inhibits the molecular chain from branching (i.e., inhibits the conversion of the primary amines to tertiary amines).

Example 8

Confirmation of the Surface Morphology in a Polymerized Solid Support Using AFM (Atomic Force Microscope)

Figure 4:
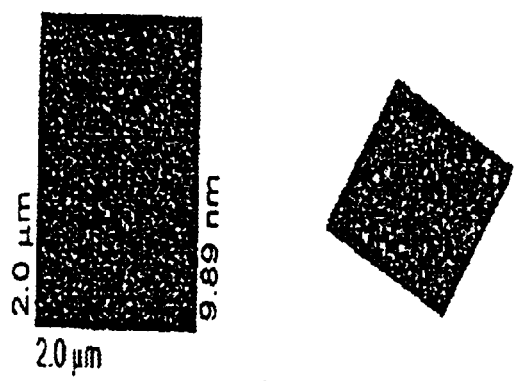
FIG. 4a is an atomic force microscope (AFM) image showing the surface morphology of an aminosilylated (non-polymerized) substrate prepared according to Example 1.
FIG. 4b is an atomic force microscope (AFM) image showing the surface morphology of a polymerized, aminosilylated substrate prepared according to Example 1.
Figure 4:
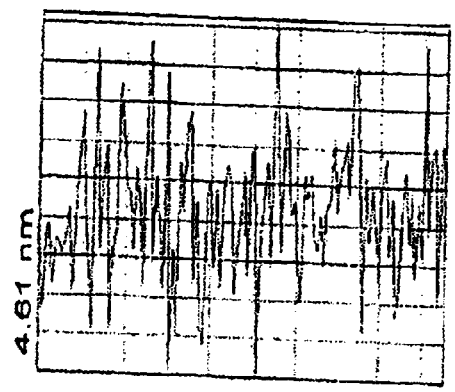
Figure 4:
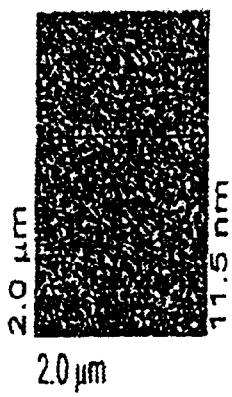
Figure 4:
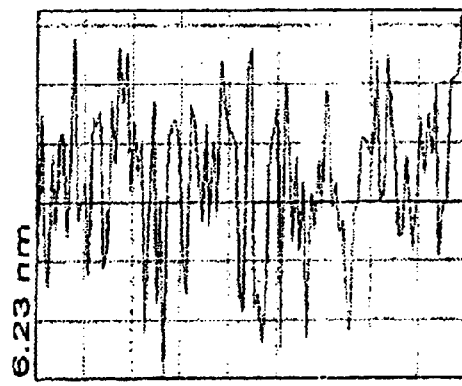

The surface structure of a silica substrate having poly (ethyleneimine) constructed from the ring-opening polymerization reaction between aminosilylated substrate and aziridine in accordance with Example 1 was surveyed using AFM (atomic force microscope (2 um×2 um)). The height difference in a partial intersection of the surface of aminosilylated (non-polymerized) substrate was 4.61 nm (FIG. 4a) and that of polymerized substrate was 6.23 nm (FIG. 4). Also, the average height difference in the surface of the polymerized substrate was 11.5 nm and that of aminosilylated substrate was 9.89 nm. The data shows that the surface of polymerized substrate is slightly rougher than the surface of the aminosilylated substrate. However, the difference in the average height variation is insignificant and both the surface structures show the smooth and similar morphologies in the images from Atomic Force Microscope(AFM) (FIG. 4). AFM is now an analytical instrument used widespread worldwide due to its superb resolution. There is no sample preparation step to take images. Samples of a moderate size (about 2–3 cm in length) can be directly analyzed.

While the present invention has been described in detail with the reference to the preferred embodiments, those skilled in the art will appreciate that the various modifications and substitutions can be made thereto without departing from the spirit and the scope of the present invention as set forth in the appended claims.

What is claimed is:

1. A method for forming solid substrates having a high density of primary amine groups, comprising:

introducing aminosilane groups onto a surface of a substrate to form an aminosilylated substrate having primary amine groups on the surface; and contacting the surface of the aminosilylated substrate with a solution comprising aziridine or an aziridine derivative in the presence of an acid catalyst and a solvent thereby increasing the density of primary amine groups on the surface of the substrate.

2. The method according to claim 1, wherein the aziridine derivative is a protected aziridine.

3. The method according to claim 2, wherein the protected aziridine is represented by the following formula 2:

[Formula 2]

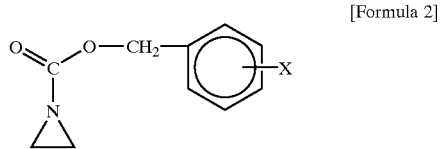

wherein X is selected from the group consisting of hydrogen, nitro, alkoxy, and mixtures thereof.

4. The method according to claim 2, wherein a linear chain without branching is formed on the surface of an aminosilylated substrate through a ring-opening polymerization between the primary amines of the aminosilylated substrate and the protected aziridine.

5. The method according to claim 2, wherein a hyperbranched poly(ethyleneimine) is formed on the surface of the aminosilylated substrate through a ring-opening polymerization between the primary amines of the aminosilylated substrate and the aziridine.

6. The method according to claim 2, wherein contacting the surface of an aminosilylated substrate with the aziridine or the aziridine derivative comprises:

immersing the aminosilylated substrate in the solution; and heating the solution having the immersed substrate.

7. The method according to claim 6, wherein the method further comprises after heating contacting the substrate with trifluoroacetic acid thereby removing the protective group from the protected aziridine.

8. The method according to claim 1, wherein the substrate is a hydroxylated substrate.

9. The method according to claim 8, wherein the hydroxylated substrate is a silicon wafer.

10. The method of claim 8, wherein the hydroxylated substrate is silica.

11. The method according to claim 1, wherein the solvent is an organic solvent.

12. The method according to claim 11, wherein the organic solvent is selected from the group consisting of dichloromethane, toluene, acetonitrile and mixtures thereof.

13. The method according to claim 1, wherein the acid catalyst is selected from the group consisting of acetic acid, p-toluenesulfonic acid, and mixtures thereof.

14. The method according to claim 1, wherein the density of primary amine groups on the surface of the substrate is increased to greater than 3.5 amines/nm$^2$.

15. The method according to claim 14, wherein the density of primary amine groups is at least 10 amines/nm$^2$.

16. The method according to claim 15, wherein the density of primary amine groups is at least 48 amines/nm$^2$.

17. A solid substrate having high density of primary amine groups which comprises an aminosilylated substrate having a surface polymerized with aziridine or an aziridine derivative, wherein the surface of the substrate has a density of primary amine groups greater than 3.5 amines/nm$^2$.

18. The solid substrate according to claim 17, wherein the density of primary amine groups is at least 10 amines/nm$^2$.

19. The solid substrate according to claim 18, wherein the density of primary amine groups is at least 48 amines/nm$^2$.

* * * * *